United States Patent
Kim et al.

(10) Patent No.: US 11,501,678 B2
(45) Date of Patent: Nov. 15, 2022

(54) DISPLAY DEVICE

(71) Applicant: Samsung Display Co., Ltd., Yongin-Si (KR)

(72) Inventors: Ji Youn Kim, Yongin-si (KR); Hong Soo Kim, Yongin-si (KR); Se Hyuk Park, Yongin-si (KR); Jun Heyung Jung, Yongin-si (KR); Man Seung Cho, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/494,915

(22) Filed: Oct. 6, 2021

(65) Prior Publication Data

US 2022/0319371 A1    Oct. 6, 2022

(30) Foreign Application Priority Data

Mar. 31, 2021  (KR) .......................... 10-2021-0042015

(51) Int. Cl.
*G09G 3/20*    (2006.01)

(52) U.S. Cl.
CPC ....... *G09G 3/20* (2013.01); *G09G 2310/0267* (2013.01); *G09G 2310/0275* (2013.01); *G09G 2310/061* (2013.01)

(58) Field of Classification Search
CPC ............. G09G 2320/0686; G09G 3/20; G09G 2310/0202; G09G 2310/0267; G09G 2310/0275; G09G 2310/061
See application file for complete search history.

(56) References Cited

U.S. PATENT DOCUMENTS

2015/0170607 A1 * 6/2015 Shin .......................... G09G 3/20
345/690

FOREIGN PATENT DOCUMENTS

| EP | 3832631 A1 | 6/2021 |
|---|---|---|
| KR | 10-2019-0045574 A | 5/2019 |
| KR | 10-2019-0136396 A | 12/2019 |
| KR | 10-2020-0015870 A | 2/2020 |

* cited by examiner

*Primary Examiner* — Gerald Johnson
(74) *Attorney, Agent, or Firm* — Innovation Counsel LLP

(57) ABSTRACT

A display panel includes a display panel displaying an image including a moving image and a static image; a controller generating first image data to the first area in a first arrangement type, and generating second image data to the second area in a second arrangement type; a scan driver sequentially supplying scan signals to all of pixel rows of the first area during a first period of a first frame and sequentially supplying scan signals to a part of pixel rows of the second area exclusively during a second period of the first frame; and a data driver supplying data signals corresponding to the first image data to data lines during the first period, and supplying data signals corresponding to the second image data to the data lines during the second period.

17 Claims, 13 Drawing Sheets

FIG. 2
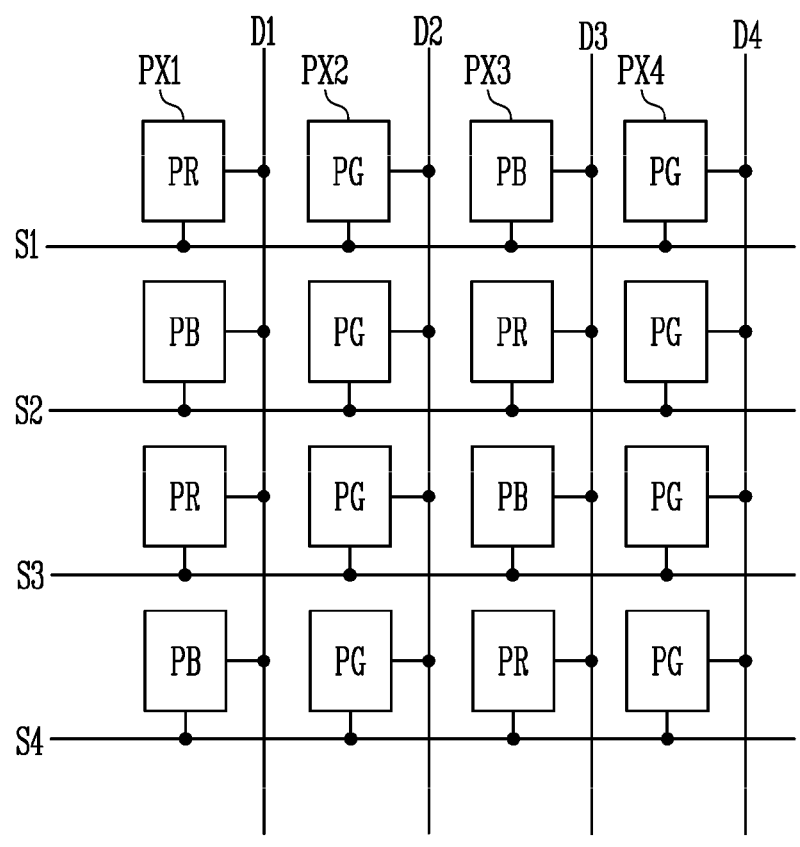
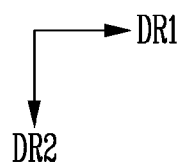

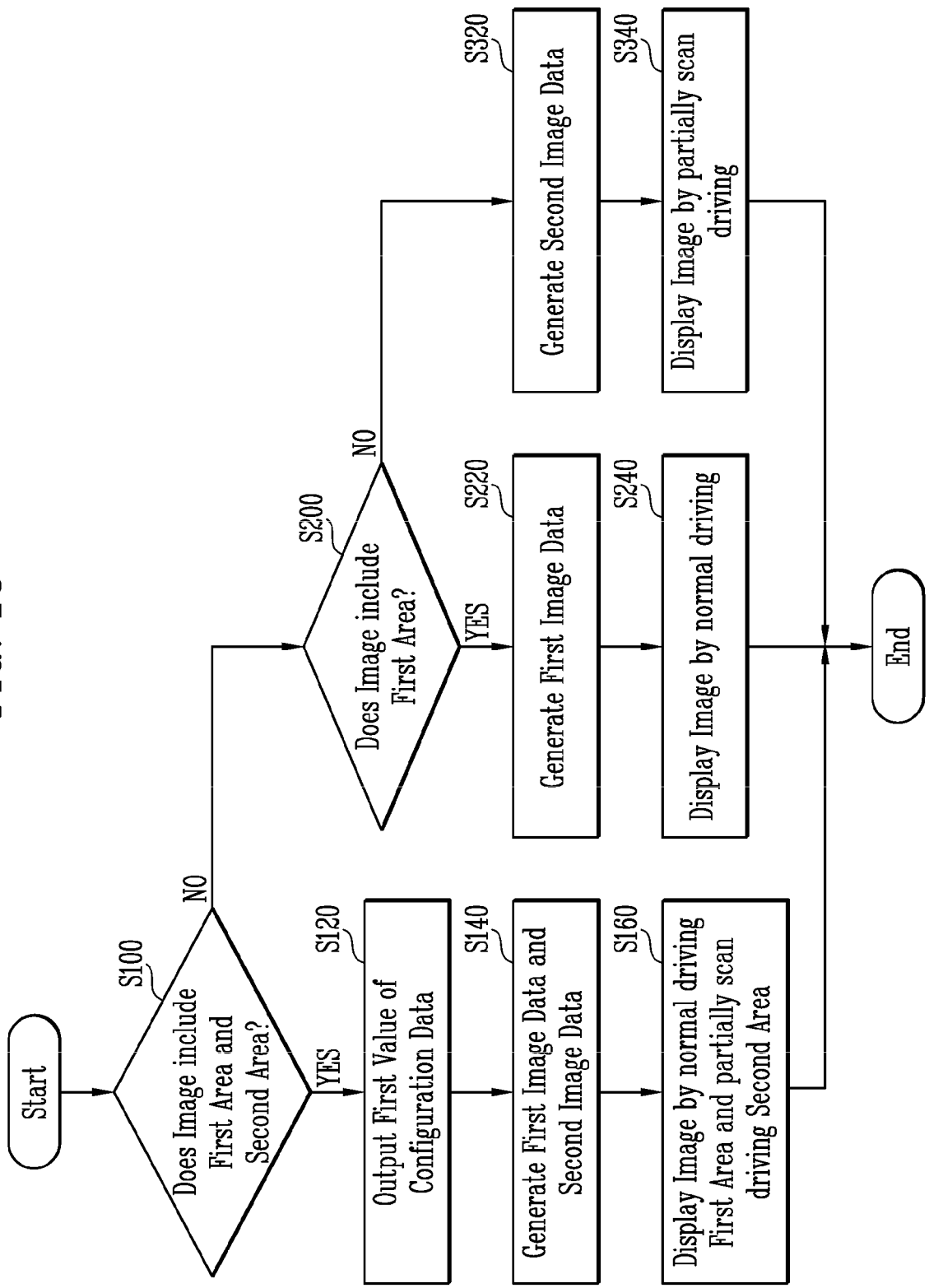

DISPLAY DEVICE

CROSS-REFERENCE TO RELATED APPLICATION

The application claims priority to and the benefit of Korean Patent Application No. 10-2021-0042015, filed Mar. 31, 2021, which is hereby incorporated by reference for all purposes as if fully set forth herein.

BACKGROUND

1. Field

The present inventive concept relates to a display device.

2. Discussion

A display device includes a display panel including pixels and a driver driving the display panel. Each of the pixels emits light with a luminance corresponding to a data signal provided through a corresponding data line in response to a scan signal provided through a scan line.

In order to reduce power consumption of an electronic device and a display device, when low power is required, such as when displaying a static image, an image may be displayed by driving at a low frequency of less than 60 Hz. Thus, a variety of research projects are being conducted to improve power consumption by varying a driving frequency according to a type of image, and to minimize deterioration in image quality when driving at the low frequency.

SUMMARY

An object of the present inventive concept is to provide a display device that controls an output of a scan signal, a conversion of image data, and an output of a data signal, in response to partial scan driving.

However, objects of the present inventive concept are not limited to the above-described object, and may be variously extended without departing from the spirit and scope of the present inventive concept.

In order to achieve the object of the present inventive concept, a display device according to embodiments of the present inventive concept may include a display panel displaying an image including at least one of a first area in which a moving image is displayed and a second area in which a static image is displayed; a controller generating first image data by rearranging image data corresponding to the first area in a first arrangement type, and generating second image data by rearranging image data corresponding to the second area in a second arrangement type; a scan driver sequentially supplying scan signals for writing data to all of pixel rows of the first area during a first period of a first frame and sequentially supplying scan signals for writing data to a part of pixel rows of the second area exclusively during a second period of the first frame; and a data driver supplying data signals corresponding to the first image data to data lines during the first period and supplying data signals corresponding to the second image data to the data lines during the second period.

According to an embodiment, the scan driver may stop supplying the scan signals during a third period of the first frame.

According to an embodiment, the scan driver may sequentially supply the scan signals to all of the pixel rows of the first area during a fourth period of a second frame, may sequentially supply the scan signals to other part of the pixel rows of the second area exclusively during a fifth period of the second frame, and may stop supplying the scan signals during a sixth period of the second frame.

According to an embodiment, a first frequency at which the first area is driven may be greater than a second frequency at which the second area is driven.

According to an embodiment, an arrangement type of the second image data of the first frame may be different from an arrangement type of the second image data of the second frame.

According to an embodiment, under the same input grayscale condition, a voltage of the data signals output to a first data line among the data lines during the first period and a voltage of the data signals output to the first data line during the second period may be different.

According to an embodiment, under the same input grayscale condition, a voltage of the data signals output to the first data line among the data lines during the second period and a voltage of the data signals output to the first data line during the fifth period may be different.

According to an embodiment, an arrangement type of the first image data may be different from at least one of the arrangement type of the second image data of the first frame and the arrangement type of the second image data of the second frame.

According to an embodiment, the data driver may stop outputting the data signals in the third period and the sixth period.

According to an embodiment, the data driver may output the data signals corresponding to the first image data of the second frame during the fourth period, and may output the data signals corresponding to the second image data of the second frame during the fifth period.

According to an embodiment, the display panel may include a first pixel row in which a red pixel, a green pixel, a blue pixel, and a green pixel are arranged in a first direction; and a second pixel row in which a blue pixel, a green pixel, a red pixel, and a green pixel are arranged in the first direction. A pixel arrangement of the first pixel row and a pixel arrangement of the second pixel row may be alternately repeated in a second direction.

According to an embodiment, the display device may further include a gamma generator providing a first gamma set corresponding to red, a second gamma set corresponding to green, and a third gamma set corresponding to blue to the data driver.

According to an embodiment, the data driver may apply the first to third gamma sets to the first image data in correspondence with the first arrangement type, and may apply the first to third gamma sets to the second image data in correspondence with the second arrangement type.

According to an embodiment, the controller may include a static image determiner which determines whether the image data is the static image by comparing input image data of successive frames and generating configuration data for determining an option for driving the first area and the second area at different frequencies based on the determination; an image data rearranger generating the first image data of the first arrangement type and the second image data of the second arrangement type based on the configuration data; and a partial scan controller generating a scan control signal and a data control signal for controlling driving of the scan driver and the data driver for the second area based on the configuration data.

According to an embodiment, the controller may provide the configuration data for determining an operation option of the data driver to the data driver during a vertical blank period of an image frame, and the configuration data may include gamma application information of each of the first and second areas corresponding to positions of the first and second areas and image data arrangement information.

According to an embodiment, the configuration data may determine the second frequency driving the second area.

According to an embodiment, under a condition in which the number of pixel rows of the second area is constant, as the second frequency decreases, the number of pixel rows to which the scan signals are supplied during the second period may decrease.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 2 is a diagram illustrating an example of a display panel included in the display device of FIG. 1.

FIG. 13 is a flowchart illustrating an example of a method of driving a display device according to embodiments of the present inventive concept.

DETAILED DESCRIPTION OF THE ILLUSTRATED EMBODIMENTS

Figure 1:
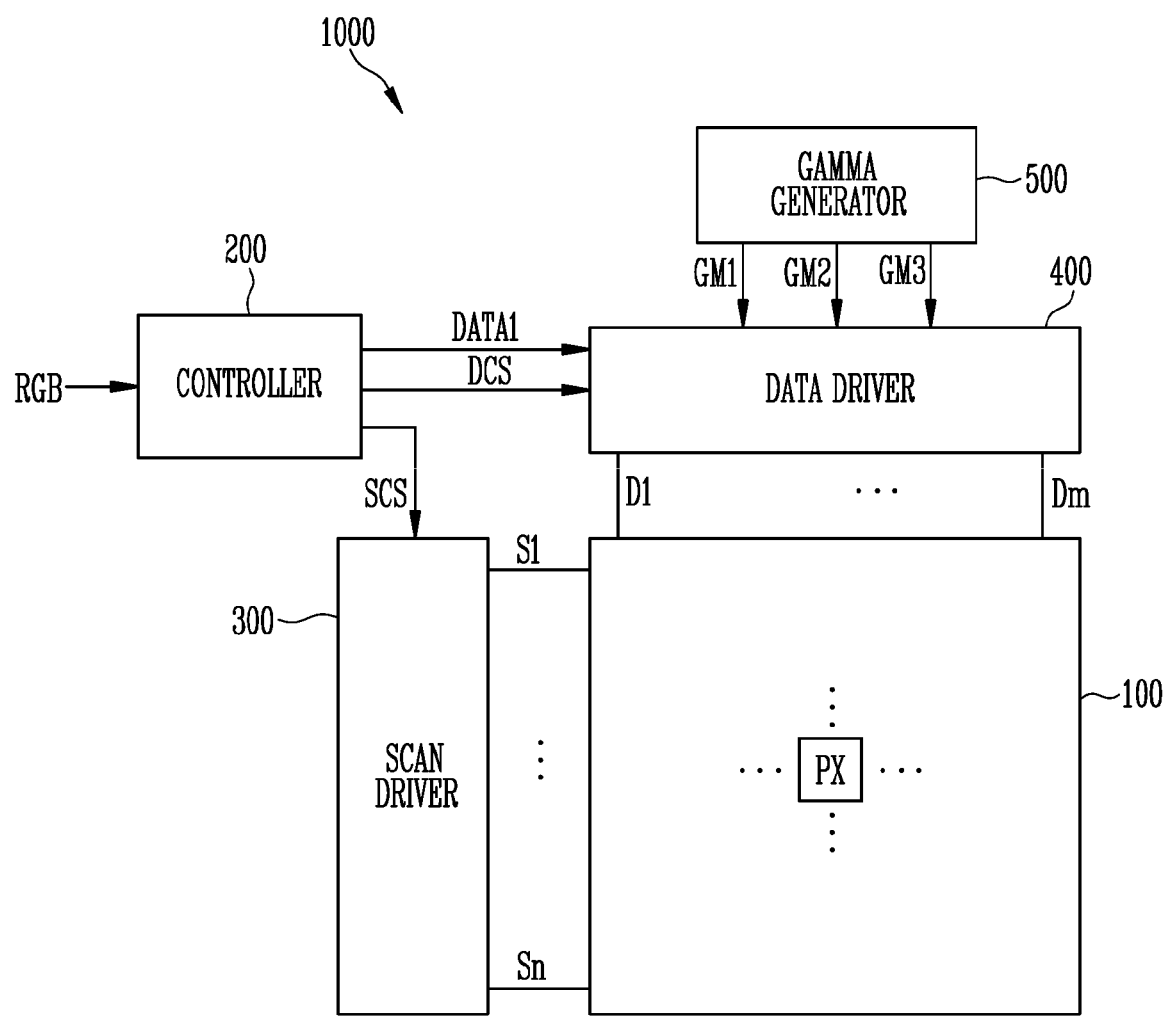
FIG. 1 is a block diagram illustrating a display device according to embodiments of the present inventive concept.

Hereinafter, preferred embodiments of the present inventive concept will be described in more detail with reference to the accompanying drawings. The same reference numerals are used for the same elements in the drawings, and duplicate descriptions for the same elements are omitted.

FIG. 1 is a block diagram illustrating a display device according to embodiments of the present inventive concept.

Referring to FIG. 1, a display device 1000 may include a display panel 100, a controller 200, a scan driver 300, and a data driver 400. The display device 1000 may further include a gamma generator 500.

The display device 1000 may be implemented as a self-light emitting display device including a plurality of self-light emitting elements. For example, the display device 1000 may be an organic light emitting display device including organic light emitting elements, a display device including inorganic light emitting elements, or a display device including light emitting elements composed of a combination of inorganic and organic materials. However, this is an example, and the display device 1000 may be implemented as a liquid crystal display device, a plasma display device, a quantum dot display device, or the like.

The display device 1000 may be a flat panel display device, a flexible display device, a curved display device, a foldable display device, or a bendable display device. In addition, the display device 1000 may be applied to a transparent display device, a head-mounted display device, a wearable display device, or the like.

The display panel 100 may include scan lines S1 to Sn, data lines D1 to Dm, and pixels PX, where n and m may be integers greater than 1. The pixels PX may be electrically connected to the data lines D1 to Dm and the scan lines S1 to Sn. Pixels (or pixel lines) that are simultaneously controlled by one scan line and receive data signals substantially simultaneously may be one pixel row. For example, pixels that receive a data signal in response to a scan signal supplied to a first scan line S1 may a first pixel row.

According to an embodiment, at least one scan line may be connected to each of the pixels PX. Although not shown, the pixels PX may be additionally connected to an emission control line.

The pixels PX may emit light with grayscale and luminance corresponding to the data signal supplied from the data lines D1 to Dm. Each of the pixels PX may include a driving transistor and at least one switching transistor. Each of the pixels PX may include an organic light emitting element, an inorganic light emitting element, or a light emitting element composed of a combination of organic and inorganic materials.

In an embodiment, the display panel 100 may include at least one of a first area in which a moving image is displayed and a second area in which a static image is displayed. When the display panel 100 does not include the second area (that is, does not include a static image), the display device 1000 may be driven in a moving image mode, and an image may be displayed at a driving frequency of 60 Hz or higher. When the display panel 100 does not display a moving image, the display device may be driven in a power saving mode, and an image may be displayed at a driving frequency lower than 60 Hz. For example, the power saving mode may include a static image mode, an always on display (AOD) mode, and the like, and the image may be displayed at the driving frequency of 30 Hz or less.

When the display panel 100 includes both the first area and the second area, the first area and the second area may be driven at different driving frequencies. For example, normal scan driving and data writing may be performed in the first area, and partial scan driving and data writing corresponding thereto may be performed in the second area.

The controller 200 may function as a timing controller. In an embodiment, the controller 200 may generate a scan control signal SCS and a data control signal DCS based on clock signals and control signals supplied from outside. The scan control signal SCS may be supplied to the scan driver 300, and the data control signal DCS may be supplied to the data driver 400. In addition, the controller 200 may rearrange input image data RGB supplied from the outside and supply image data to the data driver 400.

The scan control signal SCS may include a scan start pulse and scan clock signals. The scan start pulse may control the first timing of the scan signal. The scan clock signals may be used to shift the scan start pulse.

The data control signal DCS may include a source start pulse and data clock signals. The source start pulse may control a sampling start point of image data DATA1 that are rearranged by the controller 200. The data clock signals may be used to control a sampling operation.

The controller 200 may generate the image data DATA1 which are rearranged input image data RGB. In an embodiment, the controller 200 may generate first image data by rearranging the input image data RGB corresponding to the first area to have a first arrangement type, and may generate second image data by rearranging the input image data RGB corresponding to the second area to have a second arrangement type. The input image data RGB may be provided serially in a repeating order of red-green-blue. The controller 200 may rearrange the input image data RGB to suit a pixel arrangement of the display panel and a driving method for each area.

The order in which pixel rows are selected in the second area may be set differently from the order in which pixel rows are selected in the first area. For example, in the first area, the data signals may be sequentially written to all pixel rows of the first area. In the second area, the data signals may be sequentially written to some selected pixel rows. Accordingly, the first image data corresponding to the first area may be arranged to have the first arrangement type, and in the second mode, the second image data may be arranged to have the second arrangement type.

The scan driver 300 may supply the scan signals to the scan lines S1 to Sn corresponding to the pixel rows based on the scan control signal SCS. For example, the scan driver 300 may sequentially supply the scan signals to the scan lines S1 to Sn. When the scan signals are sequentially supplied, the pixels PX may be selected in units of horizontal lines (or units of pixel rows).

The scan driver 300 may sequentially supply the scan signals to all pixel rows (the scan lines S1 to Sn) during a first period of a first frame with respect to the first area. The scan driver 300 may sequentially supply the scan signal to a part of the pixel rows of the second area during a second period of the first frame with respect to the second area. During a third period of the first frame, the scan driver 300 may stop supplying the scan signal.

The data driver 400 may receive the data control signal DCS and the image data DATA1. The data driver 400 may supply analog data signals converted from the image data DATA1 to the data lines D1 to Dm in response to the data control signal DCS. The data signals supplied to the data lines D1 to Dm may be supplied to the pixels PX selected by the scan signal. To this end, the data driver 400 may supply the data signals to the data lines D1 to Dm so as to be synchronized with the scan signal.

In an embodiment, the data driver 400 may supply the data signals corresponding to the first image data to the data lines D1 to Dm during the first period, and supply the data signals corresponding to the second image data to the data lines D1 to Dm during the second period. During the third period, the data driver 400 may stop outputting the data signals.

In an embodiment, the gamma generator 500 may provide a first gamma set GM1 corresponding to a first color, a second gamma set GM2 corresponding to a second color, and a third gamma set GM3 corresponding to a third color to the data driver 400. For example, the first color, the second color, and the third color may be red, green, and blue, respectively.

Grayscale values of each data included in the image data DATA1 may be represented as 0 to 255 grayscales. The first gamma set GM1 may include information on gamma voltages (or grayscale voltages) corresponding to the grayscale values of red data. The second gamma set GM2 may include information on gamma voltages (or grayscale voltages) corresponding to the grayscale values of green data. The third gamma set GM3 may include information on gamma voltages (or grayscale voltages) corresponding to the grayscale values of blue data.

The data driver 400 may convert the grayscale values included in the image data DATA1 into the data signals, which are analog gamma voltages, based on the first to third gamma sets GM1, GM2, and GM3.

Since gamma curves are different according to red, green, and blue, voltages of output data signals may be different even if the grayscales are the same. For example, when the red data, the green data, and the blue data are all 100 grayscales, voltages of the data signals output corresponding thereto may be different from each other. For example, when the third gamma set GM3 of blue is applied to the image data of a red pixel, luminance of the image may be changed unintentionally and image quality may be deteriorated.

Therefore, since the first arrangement type and the second arrangement type of the image data DATA1 are different, a gamma set applied according to the arrangement type must be controlled. Under the same input grayscale condition, a change in voltage of the data signals output to a first data line during the first period and a change in voltage of the data signals output to the first data line during the second period may be different.

In an embodiment, at least some functions of the controller 200, the data driver 400, and the gamma generator 500 may be integrated into one driving circuit. For example, the driving circuit may be provided in the form of an integrated circuit that performs functions of the controller 200, the data driver 400, and the gamma generator 500.

FIG. 2 is a diagram illustrating an example of a display panel included in the display device of FIG. 1.

Referring to FIG. 2, the display panel 100 may include a plurality of pixels PX1, PX2, PX3, and PX4 and scan lines S1 to S4 and data lines D1 to D4 connected to the pixels PX1, PX2, PX3 and PX4.

FIG. 2 shows a part of the display panel 100. In FIGS. 2, S1 and D1 are not limited to first signal lines of all scan lines and data lines, respectively. For example, first to fourth scan lines S1 to S4 may be understood as scan lines corresponding to successive pixel rows, and first to fourth data lines D1 to D4 may be understood as data lines corresponding to successive pixel columns.

The pixels PX1 to PX4 may include a first pixel PX1, a second pixel PX2, a third pixel PX3, and a fourth pixel PX4. The first pixel PX1, the second pixel PX2, the third pixel PX3, and the fourth pixel PX4 may emit light of a first color, a second color, a third color, and the second color, respectively. In an embodiment, the first color, the second color, and the third color may be different colors, respectively, and may be one of red, green, and blue.

For example, in a first pixel row (and odd-numbered pixel rows) controlled by the first scan line S1, the pixels PX1, PX2, PX3, and PX4 may be arranged in the order of a red pixel PR, a green pixel PG, a blue pixel PB, and the green pixel PG in a first direction DR1. In a second pixel row (and even-numbered pixel rows) controlled by the second scan line S2, the pixels PX1, PX2, PX3, and PX4 may be arranged in the order of the blue pixel PB, the green pixel PG, the red pixel PR, and the green pixel PG in the first direction DR1.

The pixel arrangement of the first pixel row and the pixel arrangement of the second pixel row may be alternately repeated in a first direction DR1 and a second direction DR2. However, this is an example, and the pixel arrangement is not limited thereto.

Figure 3:
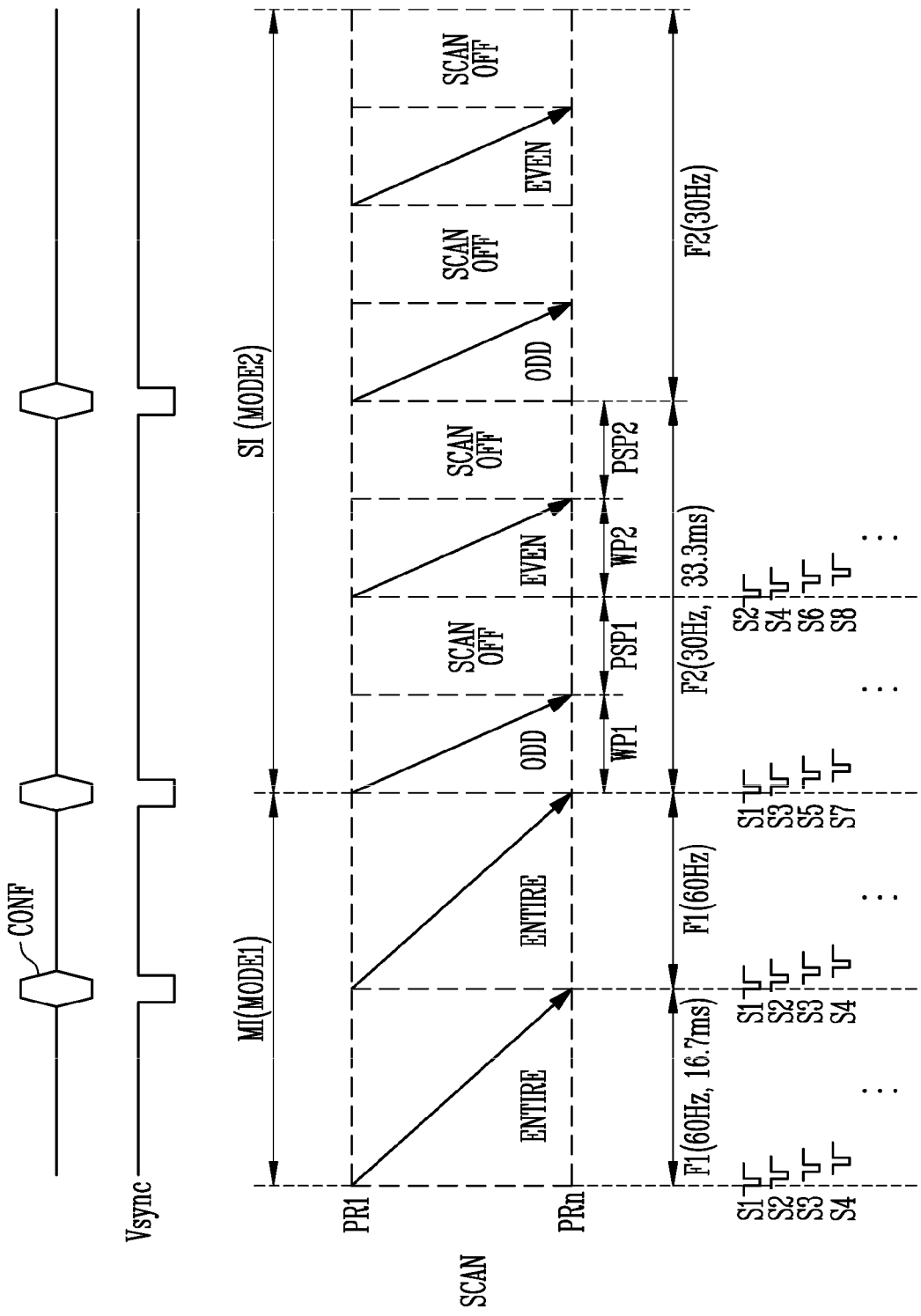
FIG. 3 is a diagram illustrating an example of an operation of a scan driver included in the display device of FIG. 1.
Figure 4:
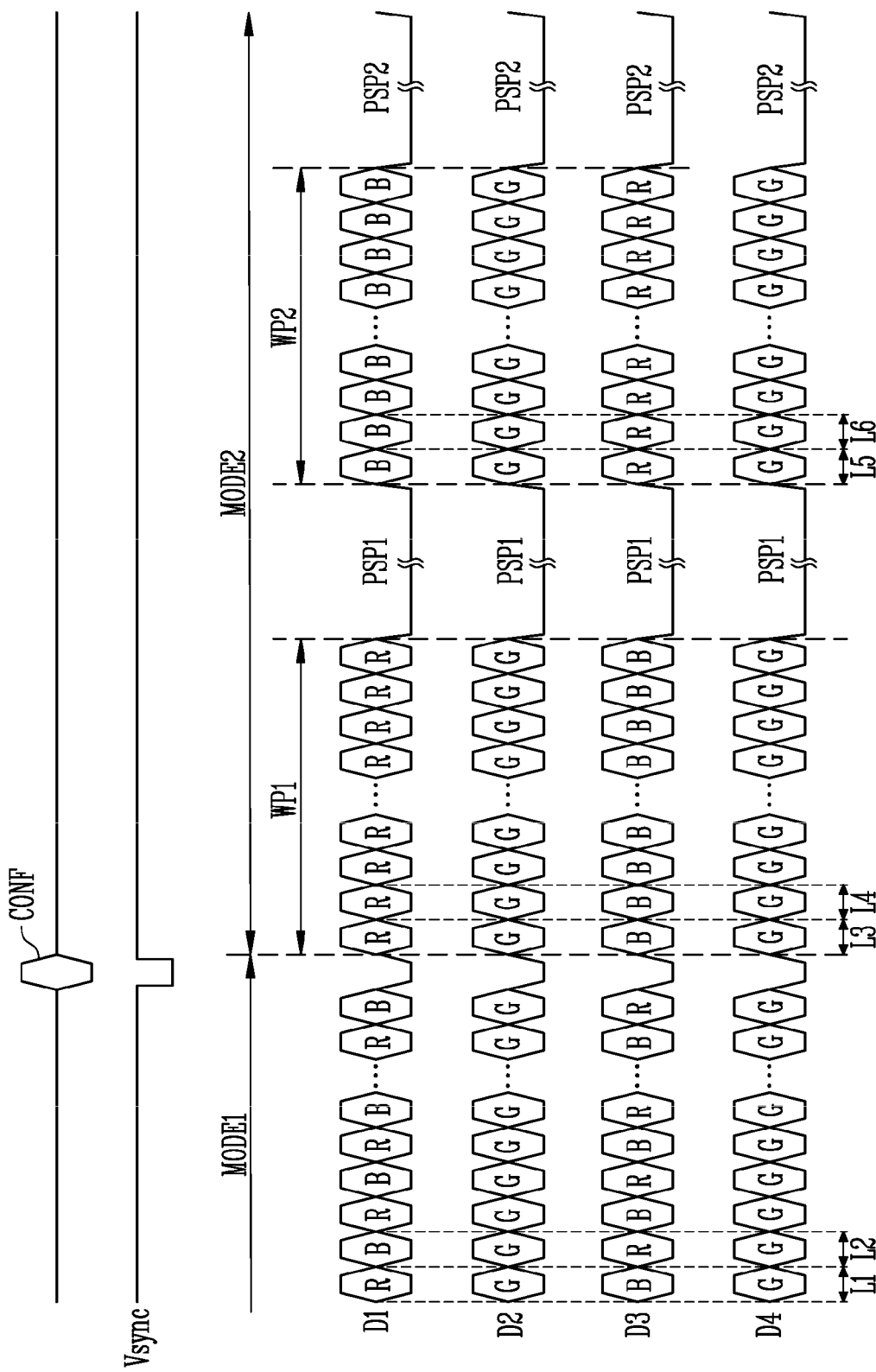
FIG. 4 is a diagram for explaining an example of data signals supplied to data lines in response to the operation of the scan driver of FIG. 3.

FIG. 3 is a diagram illustrating an example of an operation of a scan driver included in the display device of FIG. 1. FIG. 4 is a diagram for explaining an example of data signals supplied to data lines in response to the operation of the scan driver of FIG. 3.

Referring to FIGS. 1 to 4, a driving mode and a driving frequency of the display device 1000 may be changed, and a scan driving method may be changed corresponding to the driving mode.

FIGS. 3 and 4 show the driving in a first mode MODE1 in which a moving image MI is displayed in an image frame and the driving in a second mode MODE2 in which only a static image SI is displayed in an image frame. That is, an image in the first mode MODE1 may include only the first area (moving image area), and an image in the second mode MODE2 may include only the second area (static image area).

Normal scan driving and write driving may be performed in the first mode MODE1, and partial scan driving may be performed in the second mode MODE2. The partial scan driving may be activated for low frequency driving to reduce power consumption. The partial scan driving may scan part of pixel rows at a time and may scan all pixel rows by periodically supplying the scan signal for writing data to different pixel rows. In the low frequency driving to reduce power consumption, the partial scan driving may be a technique for improving a side effect such as image flicker due to leakage of a driving current within a pixel.

In an embodiment, an image frame in the first mode MODE1 may be driven at a first frequency F1 (for example, 60 Hz). Accordingly, each frame in the first mode MODE1 may be driven during a time of about 16.7 ms. The image data DATA1 may include all image data from the first pixel in a first pixel row PR1 to the last pixel in an n-th pixel row PRn (that is, the last pixel row). The image data DATA1 of the first arrangement type may correspond to the pixel arrangement of FIG. 2. For example, the image data DATA1 may have an arrangement of red-green-blue-green (for example, RGBG) in correspondence with an odd numbered pixel rows, for example, the first pixel row PR1 (refer to L1 shown in FIG. 4), and may have an arrangement of blue-green-red-green (for example, BGRG) in correspondence with an even numbered pixel rows, for example, a second pixel row PR2 (refer to L2 shown in FIG. 4).

The scan driver 300 may supply a scan signal SCAN to the pixel rows PR1 to PRn (that is, the scan lines S1 to Sn) in a normal driving method. For example, one frame may be driven at 60 Hz, and the scan signal SCAN may be sequentially supplied to the first to n-th pixel rows PR1 to PRn. The data driver 400 may output the data signals corresponding to each of the first to n-th pixel rows PR1 to PRn one row at a time in synchronization with the scan signal.

In an embodiment, an image frame in the second mode MODE2 may be driven at a second frequency F2 (for example, 30 Hz). Each frame may be driven during a time of about 33.3 ms. In an embodiment, a frame in the second mode MODE2 may include first and second writing periods WP1 and WP2 and first and second power saving periods PSP1 and PSP2. The writing periods WP1 and WP2 and the power saving periods PSP1 and PSP2 may be set to proceed alternately.

The image data DATA1 of the second arrangement type may be rearranged to correspond to each of the writing periods WP1 and WP2.

In an embodiment, the image data DATA1 corresponding to the first writing period WP1 may be image data of the odd-numbered pixel rows, and the image data DATA1 corresponding to the second writing period WP2 may be image data of the even-numbered pixel rows.

In the first writing period WP1, the scan signal SCAN for writing data to the odd-numbered pixel rows may be sequentially supplied. For example, the scan signal SCAN may be sequentially supplied to the first scan line S1, a third scan line S3, a fifth scan line S5, and a seventh scan line S7. The timing at which the scan signal is supplied to the first scan line S1, the third scan line S3, the fifth scan line S5, and the seventh scan line S7 in the first writing period WP1 may be substantially the same as the timing at which the scan signal is supplied to the first scan line S1, the second scan line S2, the third scan line S3, and the fourth scan line S4 in the first mode. Therefore, in this case, compared to the case when driving at 60 Hz in the first mode MODE1, since the pixel rows to which the scan signal SCAN is supplied are reduced by half, the length of the first writing period WP1 may correspond to about half of the time when the scan signal SCAN is supplied to all pixel rows when driving at 60 Hz.

In the second writing period WP2, the scan signal SCAN for writing data to the even-numbered pixel rows may be sequentially supplied. The length of the second writing period WP2 may correspond to about half of the time when the scan signal SCAN is supplied to all pixel rows when driving at 60 Hz.

The first writing period WP1 and the second writing period WP2 may be repeated at a frequency of 30 Hz, respectively.

In this way, the first writing period WP1 for writing the data signals to the odd-numbered pixel rows and the second writing period WP2 for writing the data signals to the even-numbered pixel rows may be repeated at a frequency of 30 Hz, respectively. Accordingly, it can be understood that the second mode MODE2 is substantially driven at 30 Hz.

In the first power saving period PSP1 and the second power saving period PSP2, the supply of the scan signal SCAN and the supply of the data signals may be stopped. In addition, some functions of the controller 200 for driving the scan driver 300 and the data driver 400 may also be deactivated. In the first power saving period PSP1 and the second power saving period PSP2, the image corresponding to the data signals written to each of the corresponding pixels immediately before may be displayed.

Frames may be divided by a vertical synchronization signal Vsync. A time point at which the vertical synchronization signal Vsync is output may be controlled by the controller 200 and may be provided to the data driver 400. A period in which the vertical synchronization signal Vsync is supplied may correspond to a vertical blank period of a frame. The data driver 400 may be operated in response to the vertical synchronization signal Vsync.

In an embodiment, the controller 200 may provide configuration data CONF for determining an operation option of the data driver to the data driver 400 during the vertical blank period in which the vertical synchronization signal Vsync is supplied. The configuration data CONF may include gamma application information of each of the first and second areas corresponding to positions of the first and second areas and image data arrangement information.

The data driver 400 may select a gamma set corresponding to the color of the image data DATA1 based on the gamma application information included in the configuration data, and may convert a digital grayscale value corresponding to a position of a corresponding pixel into an analog data signal using the selected gamma set. That is, the gamma set corresponding to the color (arrangement type) of the image data DATA1 may be appropriately selected according to the gamma application information.

FIG. 4 shows the image data corresponding to the data signals output to the first data line D1, the image data corresponding to the data signals output to the second data line D2, the image data corresponding to the data signals output to the third data line D3, and the image data corresponding to the data signals output to the fourth data line D4 in each of the first mode MODE1 and the second mode MODE2. In an embodiment, the controller 200 may generate (or arrange) the image data DATA1 according to the order in which the pixel rows PR1 to PRn are selected in the writing periods WP1 and WP2 of the second mode MODE2.

The data signal corresponding to the red pixel PR may be generated by applying the first gamma set GM1 to red data R. The second gamma set GM2 may be applied to green data G, and the third gamma set GM3 may be applied to blue data B.

Meanwhile, an arrangement of the image data in a vertical direction in FIG. 4 may be understood as an arrangement of the image data corresponding to each of the pixel rows. As described with reference to FIG. 3, for the partial scan driving in the second mode MODE2, the image data DATA1 may be arranged differently from the first mode MODE1, and the data signals may be output differently. In the first mode MODE1, an arrangement of RGBG (corresponding to a first line L1 (for example, the first pixel row)) and an arrangement of BGRG (corresponding to a second line L2 (for example, the second pixel row)) may be alternately output for each pixel row. In the first writing period WP1 of the second mode MODE2, only the arrangement of RGBG (corresponding to the odd numbered pixel rows in the second area, for example, a third line L3 (for example, the first pixel row) and a fourth line L4 (for example, a third pixel row)) may be repeated. In the second writing period WP2 of the second mode MODE2, only the arrangement of BGRG (corresponding to a fifth line L5 (for example, the second pixel row) and a sixth line L6 (for example, a fourth pixel row)) may be repeated. The supply of the image data DATA1 and/or the data signals may be stopped during the first and second power saving periods PSP1 and PSP2.

In an embodiment, in the pixel arrangement structure of FIG. 2, only the data signals corresponding to the green data G may be output to the second data line D2 and the fourth data line D4 (for example, even-numbered data lines). Accordingly, the second gamma set GM2 may be applied to the green data G corresponding to the second data line D2 and the fourth data line D4.

In the first mode MODE1, the red data R and the blue data B may be alternately output to the first data line D1, and the blue data B and the red data R may be alternately output to the third data line D3. Accordingly, the first gamma set GM1 and the third gamma set GM3 may be alternately applied to the first data line D1, and the third gamma set GM3 and the first gamma set GM1 may be alternately applied to the third data line D3.

In an embodiment, since only the odd-numbered pixel rows are selected in the first writing period WP1, the red data R may be continuously output to the first data line D1 in the first writing period WP1. In the first writing period WP1, the first gamma set GM1 may be applied to the image data corresponding to the first data line D1. In addition, in the first writing period WP1, the blue data B may be continuously output to the third data line D3. In the first writing period WP1, the third gamma set GM3 may be applied to the image data corresponding to the third data line D3.

Since only the even-numbered pixel rows are selected in the second writing period WP2, the blue data B may be continuously output to the first data line D1. In the second writing period WP2, the third gamma set GM3 may be applied to the image data corresponding to the first data line D1. In addition, in the second writing period WP2, the red data R may be continuously output in correspondence with the third data line D3. In the second writing period WP2, the first gamma set GM1 may be applied to the image data corresponding to the third data line D3.

Figure 5:
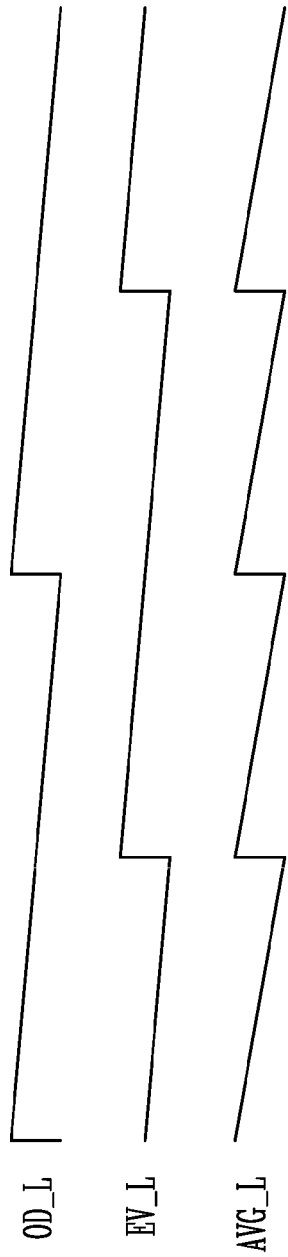
FIG. 5 is a diagram schematically illustrating a change in luminance when driving at 30 Hz in FIG. 3.

FIG. 5 is a diagram schematically illustrating a change in luminance when driving at 30 Hz in FIG. 3.

Referring to FIGS. 4 and 5, a first luminance OD_L that is luminance of the odd-numbered pixel rows and a second luminance EV_L that is luminance of the even-numbered pixel rows may be detected differently by the partial scan driving.

The pixel may include a light emitting element that emits light according to a driving current. The driving current may leak due to inherent characteristics of transistors included in the pixel. Accordingly, when the light emitting element emits light after data is written, the luminance may decrease over time due to leakage of the driving current.

As shown in FIG. 4, the first writing period WP1 for the odd-numbered pixel rows and the second writing period WP2 for the even-numbered pixel rows may be alternately repeated with each other in a cycle of 30 Hz.

Accordingly, the first luminance OD_L and the second luminance EV_L may be refreshed every about 33.4 ms, respectively. Accordingly, an average luminance AVG_L, which is an average of the first luminance OD_L and the second luminance EV_L, may exhibit a change in luminance similar to that of driving at 60 Hz.

Figure 6:
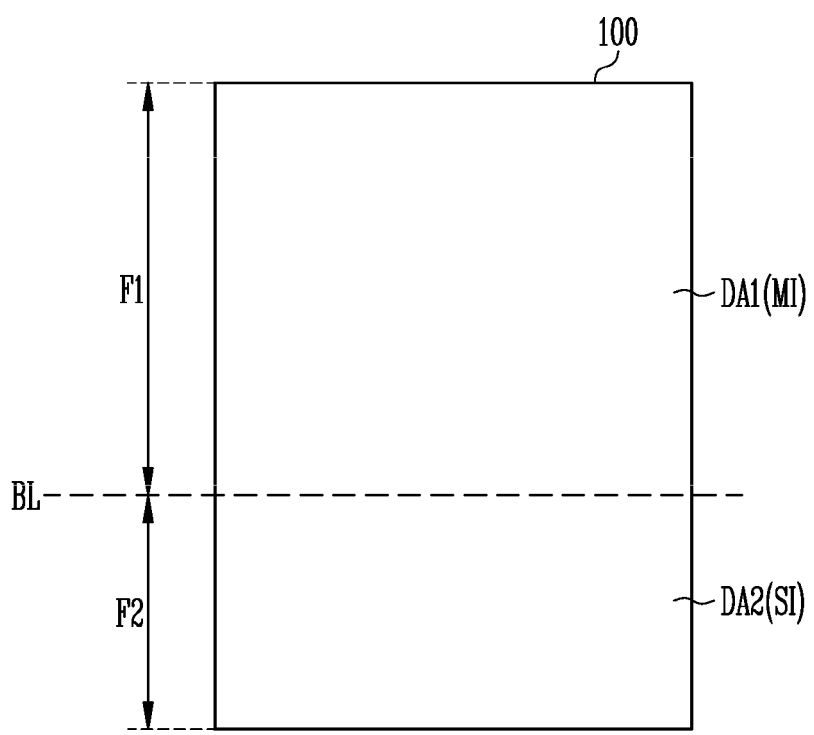
FIG. 6 is a diagram illustrating an example in which a first area and a second area are divided in the display device of FIG. 1.

FIG. 6 is a diagram illustrating an example in which a first area and a second area are disposed in the display device of FIG. 1.

Referring to FIGS. 1, 2, and 6, the display panel 100 may display an image including a first area DA1 in which a moving image MI is displayed and a second area DA2 in which a static image SI is displayed.

The first area DA1 and the second area DA2 may be divided by a virtual boundary line BL. The boundary line BL may correspond to a predetermined pixel row.

In an embodiment, the first area DA1 may be driven at a first frequency F1, and the second area DA2 may be driven at a second frequency F2. The first frequency F1 may be higher than the second frequency F2. For example, the first frequency F1 may be about 60 Hz, and the second frequency F2 may be about 30 Hz. That is, in order to reduce power consumption, the first area DA1 and the second area DA2 may be driven at different driving frequencies (for example, multi-frequency driving).

In response to such multi-frequency driving, the arrangement of image data for the first and second areas DA1 and DA2 and the application of the gamma set corresponding thereto must be different. The display device 1000 according to embodiments of the present inventive concept may control outputs of the scan signal and the data signal to optimize driving of the image including the first area DA1 and the second area DA2.

Figure 7:
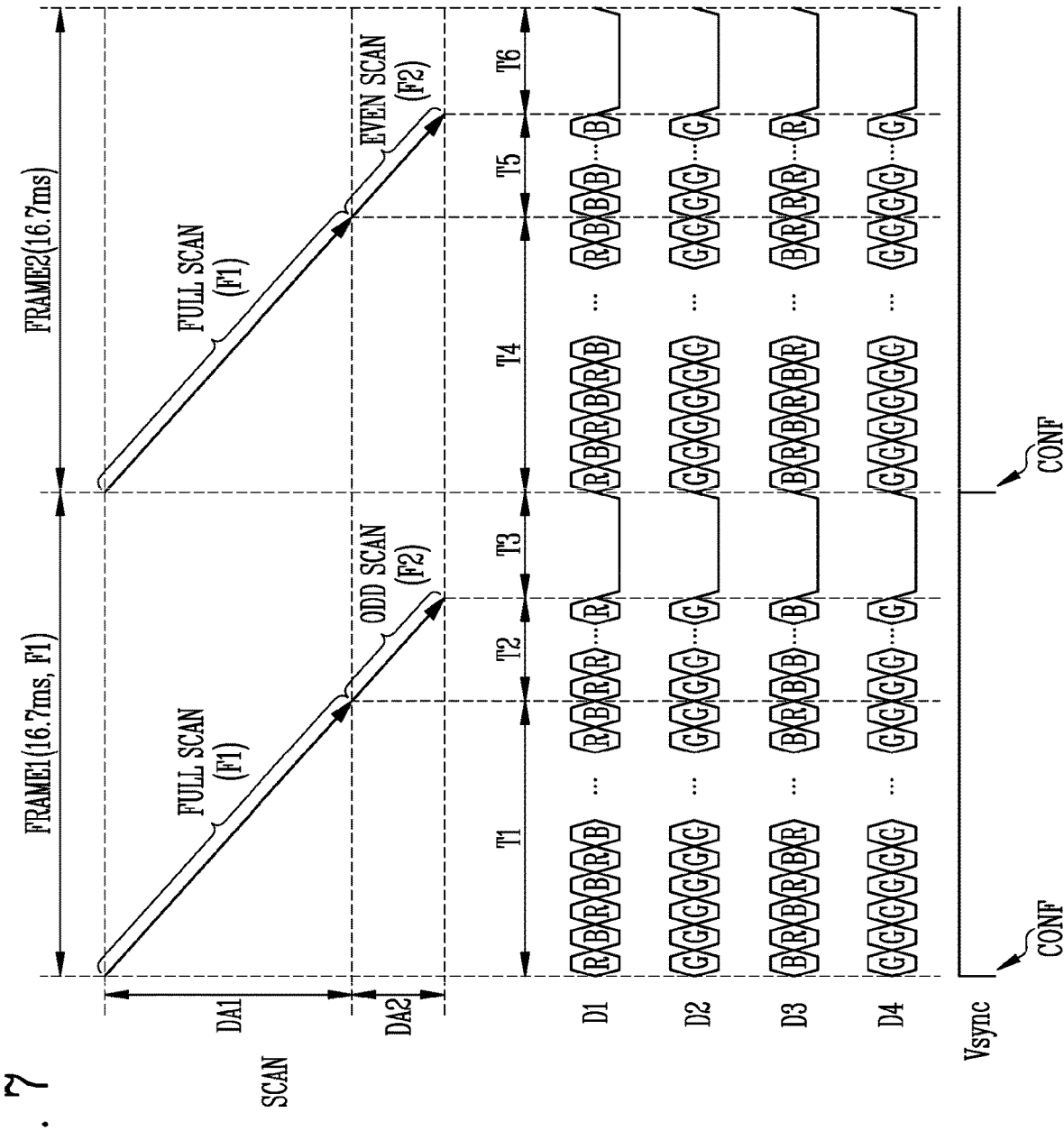
FIG. 7 is a diagram illustrating an example of an operation for driving the display panel of FIG. 6.
Figure 8:
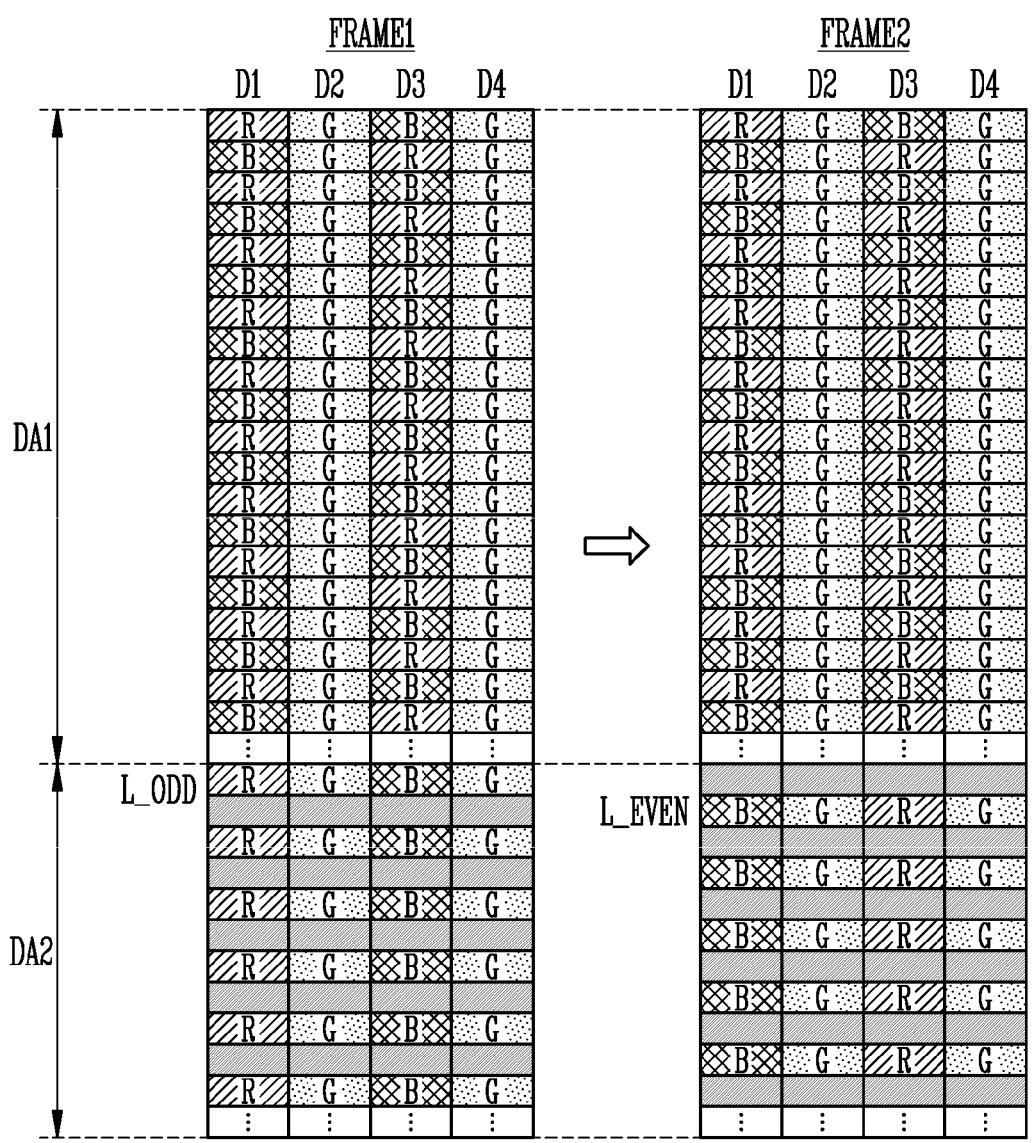
FIG. 8 is a diagram illustrating an example of data signals provided to the first area and the second area in response to the operation of FIG. 7.

FIG. 7 is a diagram illustrating an example of an operation for driving the display panel of FIG. 6. FIG. 8 is a diagram illustrating an example of data signals provided to the first area and the second area in response to the operation of FIG. 7.

Referring to FIGS. 1, 6, 7, and 8, in a first frame FRAME1 and a second frame FRAME2, full scan driving may be performed for the first area DA1 and partial scan driving may be performed for the second area DA2.

The first frame FRAME1 and the second frame FRAME2 may be divided by the vertical synchronization signal Vsync. In an embodiment, the first frame FRAME1 and the second frame FRAME2 may be driven at the first frequency F1. The configuration data CONF may be provided to the data driver 400 during the vertical blank period in which the vertical synchronization signal Vsync is supplied.

In an embodiment, since the first frame FRAME1 and the second frame FRAME2 include the first area DA1 and the second area DA2, the configuration data CONF may include arrangement information and gamma application information of the image data corresponding to the first area DA1, and arrangement information and gamma application information of the image data corresponding to the second area DA2.

The first image data corresponding to the first area DA1 may be arranged in the first arrangement type and the second image data corresponding to the second area DA2 may be arranged in the second arrangement type.

For example, as shown in FIG. 8, the image data corresponding to the first pixel row in the first area DA1 may have an arrangement of the red data R, the green data G, the blue data B, and the green data G (hereinafter, referred to as an RGBG arrangement). In addition, the image data corresponding to the second pixel row following the first pixel row in the first area DA1 may have an arrangement of the blue data B, the green data G, the red data R, and the green data G (hereinafter, referred to as a BGRG arrangement). That is, the red data R and the blue data B may be alternately displayed along the pixel column.

In addition, as shown in FIG. 8, since the data signals are supplied to odd-numbered pixel rows L_ODD or even-numbered pixel rows L_EVEN in the second area DA2, the second arrangement type may have the RGBG arrangement in the first frame FRAME1, and may have the BGRB arrangement in the second frame FRAME2.

That is, the controller 200 may rearrange the input image data RGB of one frame into the first image data of the first arrangement type and the second image data of the second arrangement type.

The scan driver 300 may sequentially supply the scan signal to all of the pixel rows in the first area DA1 during a first period T1 of the first frame FRAME1.

The data driver 400 may generate the data signals by applying the corresponding first to third gamma sets GM1, GM2, and GM3 to the first image data of the first arrangement type. The data driver 400 may output the data signals converted from the first image data in synchronization with the scan signal during the first period T1.

For example, the data driver 400 may alternately latch the red data R and the blue data B to the first data line D1, and alternately latch the blue data B and the red data R to the third data line D3. The first gamma set GM1 and the third gamma set GM3 may be alternately applied to the data latched in correspondence with the first data line D1, and the third gamma set GM3 and the first gamma set GM1 may be alternately applied to the data latched in correspondence with the third data line D3. Accordingly, a data signal suitable for each of the red data R and the blue data B may be generated.

The second gamma set GM2 may be applied to the data latched in correspondence with the second and fourth data lines D2 and D4, and the data signals corresponding to the green data G may be output. Also, the operation of the data driver 400 for the second and fourth data lines D2 and D4 may be the same in both the first area DA1 and the second area DA2.

Accordingly, the data signals may be sequentially written to all pixel rows in the first area DA1 during the first period T1.

The scan driver 300 may sequentially supply the scan signal to a part of the pixel rows in the second area DA2 during a second period T2 of the first frame FRAME1. In an embodiment, the scan driver 300 may sequentially supply the scan signal to the odd-numbered pixel rows L_ODD in the second area DA2 during the second period T2. The second image data of the second arrangement corresponding to the odd-numbered pixel rows L_ODD may have the RGBG arrangement.

The data driver 400 may generate the data signals by applying the corresponding first to third gamma sets GM1, GM2, and GM3 to the second image data. The data driver 400 may output the data signals converted from the second image data in synchronization with the scan signal during the second period T2.

For example, the data driver 400 may continuously latch the red data R in correspondence with the first data line D1, and may continuously latch the blue data B in correspondence with the third data line D3. Accordingly, the first gamma set GM1 may be applied to the data latched in correspondence with the first data line D1, and the third gamma set GM3 may be applied to the data latched in correspondence with the third data line D3.

Accordingly, the data signals corresponding to the color of each pixel may be sequentially written to the odd-numbered pixel rows L_ODD in the second area DA2 during the second period T2.

In an embodiment, under the same input grayscale condition, a voltage of the data signals output to the first data line D1 in the first period T1 may be different from a voltage of the data signals output to the first data line D1 in the second period T2. For example, when both the red data R and the blue data B connected to the first data line D1 have a value of 200 grayscales, a first voltage level corresponding to the first gamma set GM1 and a second voltage level corresponding to the second gamma set GM3 may be alternately output to the first data line D1 in the first period T1, and a data signal of the first voltage level corresponding to the first gamma set GM1 may be output to the first data line D1 in the second period T2.

Similarly, under the same input grayscale condition, a voltage of the data signals output to the third data line D3 in the first period T1 may be different from a voltage of the data signals output to the third data line D3 in a second period T2. For example, when both the red data R and the blue data B have a value of 200 grayscales, the third voltage level corresponding to the third gamma set GM3 and the first voltage level corresponding to the first gamma set GM1 may be alternately output to the third data line D3 in the first period T1, and a data signal of the third voltage level corresponding to the third gamma set GM3 may be output to the third data line D3 in the second period T2.

In the third period T3, the supply of the scan signal and the data signal may be stopped. When the partial scan driving is not applied, scanning (and data writing) for the second area DA2 may be performed during the third period T3. However, since the scanning is performed only on the odd-numbered pixel rows L_ODD in the second area DA2 during the first frame FRAME1, the supply of the scan signal and the data signal may be stopped during the third period T3 corresponding to a time required for scanning the even-numbered pixel rows L_EVEN among the times allocated to the first frame FRAME1. Thus, power consumption can be reduced.

The second frame FRAME2 may include a fourth period T4, a fifth period T5, and a sixth period T6. Since the driving of the fourth period T4 and the sixth period T6 is substantially the same as the driving of the first period T1 and the third period T3, respectively, duplicate descriptions will be omitted.

During the fifth period T5 of the second frame FRAME2, the scan driver 300 may sequentially supply the scan signal to the pixel rows which is not selected in the second period T2. In an embodiment, the scan driver 300 may sequentially supply the scan signal to the even-numbered pixel rows L_EVEN in the second area DA2 during the fifth period T5. The second image data of the second arrangement corresponding to the even-numbered pixel rows L_EVEN may have the BGRG arrangement.

The data driver 400 may generate the data signals by applying the corresponding first to third gamma sets GM1, GM2, and GM3 to the second image data. The data driver 400 may output the data signals converted from the second image data in synchronization with the scan signal during the fifth period T5.

For example, the data driver 400 may continuously latch the blue data B in correspondence with the first data line D1 and may continuously latch the red data R in correspondence with the third data line D3. Accordingly, the third gamma set GM3 may be applied to the data latched in correspondence with the first data line D1, and the first gamma set GM1 may be applied to the data latched in correspondence with the third data line D3.

Accordingly, the data signals corresponding to the color of each pixel may be sequentially written to the even-numbered pixel rows L_EVEN in the second area DA2 during the fifth period T5.

In an embodiment, under the same input grayscale condition, a voltage of the data signals output to the first data line D1 in the fourth period T4 may be different from a voltage of the data signals output to the first data line D1 in the fifth period T5. Likewise, under the same input grayscale condition, a voltage of the data signals output to the third data line D3 in the fourth period T4 may be different from a voltage of the data signals output to the third data line D3 in the fifth period T5.

In an embodiment, under the same input grayscale condition, a voltage of the data signals output to the first data line D1 in the fifth period T5 may be different from a voltage of the data signals output to the first data line D1 in the second period T2. That is, the data signals corresponding to the blue data B may be output to the first data line D1 in the fifth period T5, and the data signals corresponding to the red data R may be output to the first data line D1 in the second period T2.

Likewise, under the same input grayscale condition, a voltage of the data signals output to the third data line D3 in the fifth period T5 may be different from a voltage of the data signals output to the third data line D3 in the second period T2.

Meanwhile, since the scanning for the odd-numbered pixel rows L_ODD in the second area DA2, which is the operation of the second period T2, is repeated in the next frame of the second frame FRAME2, it may be understood that the second frequency F2 driving the second area DA2 is 30 Hz, which is half of the first frequency F1. Likewise, the operation of the fifth period T5 may also be repeated at the second frequency F2. Accordingly, it may be understood that the second area DA2 is driven at a driving frequency different from that of the first area DA1.

In addition, although it has been described that the second area DA2 is positioned below the first area DA1 in FIGS. 6 to 8, the arrangement of the first and second areas DA1 and DA2 is not limited thereto. For example, when the second area DA2 is positioned above the first area DA1, the first frame FRAME1 may proceed in the order of the second period T2, the third period T3, and the first period T1, and the second frame FRAME2 may proceed in the order of the fifth period T5, the sixth period T6, and the fourth period T4.

As described above, according to the display device 1000 and the driving method thereof according to the embodiments of the present inventive concept, the image data DATA1 may be arranged in different arrangement types in the first area DA1 and the second area DA2 according to the partial scan driving of the second area DA2, and different gamma sets GM1, GM2, and GM3 may be applied to outputs of the data signals corresponding to the odd-numbered data lines D1 and D3 in the first area DA1 and the second area DA2. Therefore, in the second area DA2 in which the partial scan driving is performed, incorrect application (mismatch) of blue gamma (red gamma) with respect to the red data R (blue data B) and a difference in gamma and luminance between upper and lower portions of the image may be prevented or minimized. In addition, the data signals can be optimized and output in each of the first area DA1 and the second area DA2. Accordingly, both power consumption and image quality can be improved during the multi-frequency driving including the partial scan driving.

Figure 9:
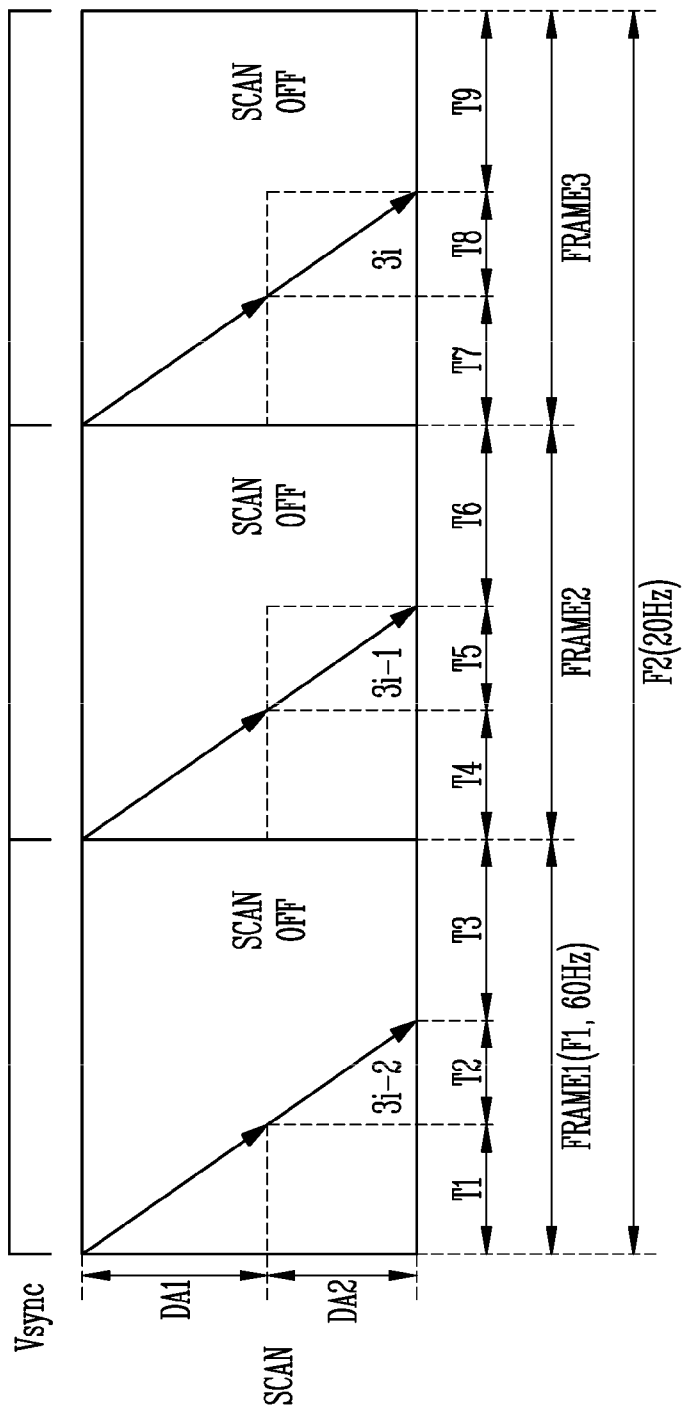
FIG. 9 is a diagram illustrating an example of an operation of a scan driver driving the display panel of FIG. 6.

FIG. 9 is a diagram illustrating an example of an operation of a scan driver driving the display panel of FIG. 6.

In FIG. 9, the same reference numerals may be used for the components described with reference to FIG. 7, and duplicate descriptions of these components will be omitted.

Referring to FIGS. 1, 6, and 9, the first frequency F1 driving the first area DA1 may be 60 Hz, and the second frequency F2 driving the second area DA2 may be 20 Hz.

First to third frames FRAME1 to FRAME3 may be divided by the vertical synchronization signal Vsync. Since the second frequency F2 corresponds to ⅓ of the first frequency F1, the scanning (and data writing) may be performed on all pixel rows in the second area DA2 over the first to third frames FRAME1 to FRAME3. In an embodiment, the length of the second period T2 may be about half of the third period T3. The length of the fifth period T5 may be about half of the sixth period T6. The length of an eighth period T8 may be about half of the length of a ninth period T9.

In an embodiment, under a condition in which the number of pixel rows in the second area DA2 is constant, as the second frequency F2 decreases, the number of pixel rows to which the scan signal is supplied in the second period T2 may be decreased. For example, when the second frequency F2 driving the second area DA2 including k pixel rows is 30 Hz, k/2 pixel rows may be selected in the second period T2.

When the second frequency F2 is 20 Hz, k/3 pixel rows may be selected in the second period T2. When the second frequency F2 is 10 Hz, k/4 pixel rows may be selected. In addition, when the second frequency F2 is 5 Hz, k/6 pixel rows may be selected.

In each of the first period T1, the fourth period T4, and the seventh period T7, the scan is signal may be sequentially supplied to all pixel rows in the first area DA1.

In the second period T2, (3i-2)th pixel rows among the pixel rows in the second area DA2 may be sequentially selected, where i may be an integer greater than 1. Accordingly, the odd-numbered pixel rows and the even-numbered pixel rows of the second area DA2 may be alternately selected. Since (3i-1)th pixel rows are selected in the fifth period T5, the even-numbered pixel rows and the odd-numbered pixel rows may be alternately selected. Since 3i-th pixel rows are selected in the eighth period T8, the odd-numbered pixel rows and the even-numbered pixel rows may be alternately selected.

In the third period T3, the sixth period T6, and the ninth period T9, the supply of the scan signal and the data signal may be stopped. For example, the driving of at least one of the scan driver 300 and the data driver 400 may be stopped during the third period T3, the sixth period T6, and the ninth period T9. Thus, power consumption can be reduced.

Figure 10:
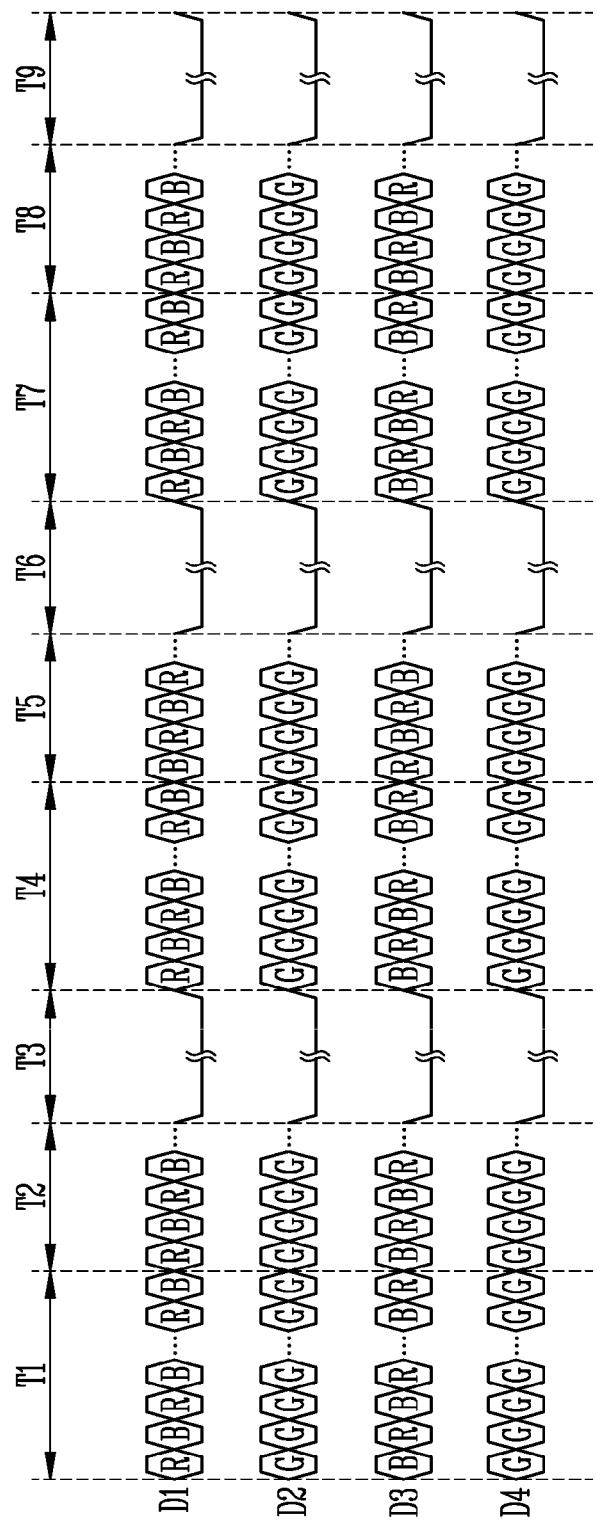
FIG. 10 is a diagram for explaining an example of data signals supplied to data lines in response to the operation of the scan driver of FIG. 9.
Figure 11:
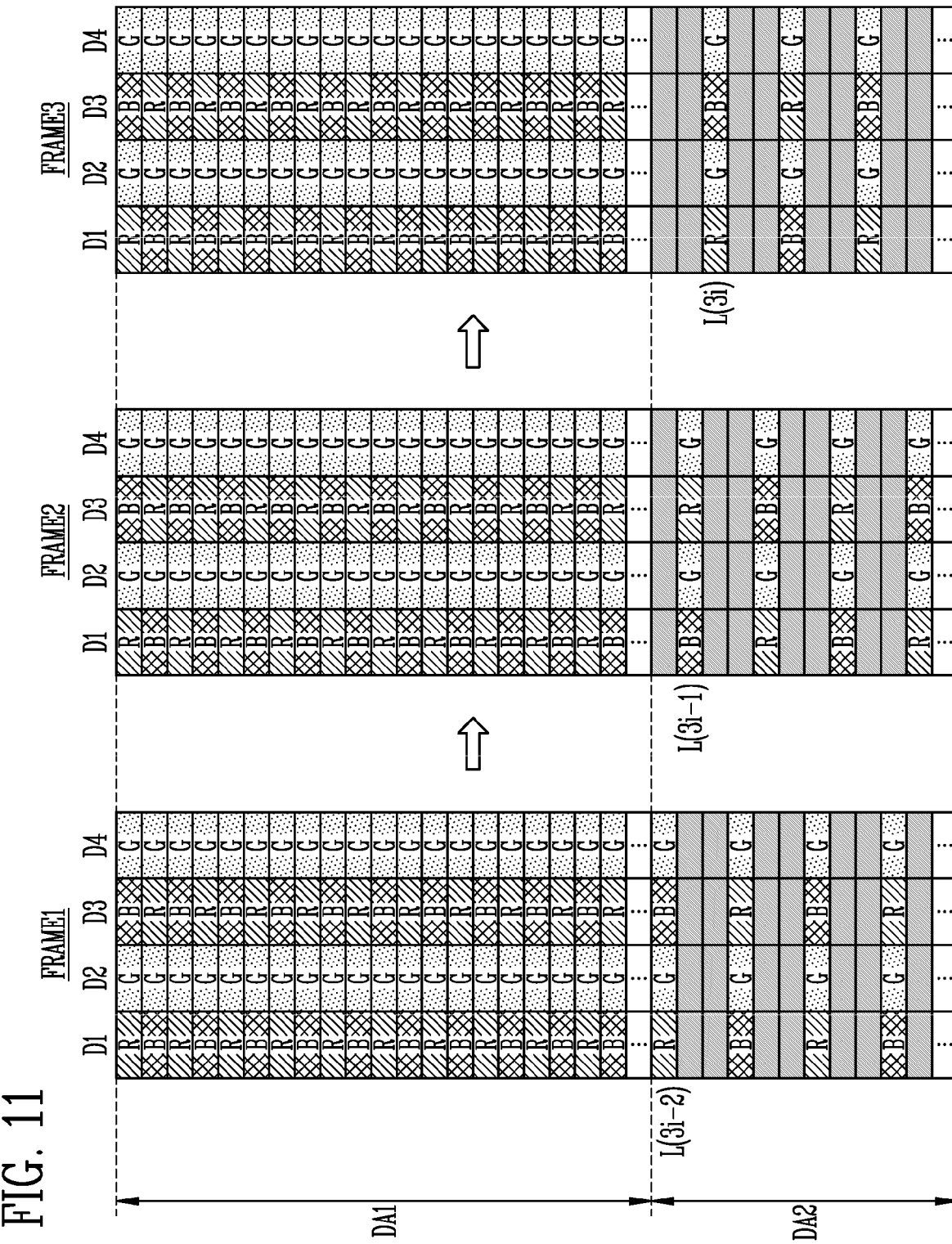
FIG. 11 is a diagram illustrating an example of data signals provided to the first area and the second area in response to the operation of FIGS. 9 and 10.

FIG. 10 is a diagram for explaining an example of data signals supplied to data lines in response to the operation of the scan driver of FIG. 9. FIG. 11 is a diagram illustrating an example of data signals provided to the first area and the second area in response to the operation of FIGS. 9 and 10.

In FIGS. 10 and 11, the same reference numerals may be used for the components described with reference to FIGS. 7 and 8, and duplicate descriptions of these components will be omitted.

Referring to FIGS. 1, 6, 9, 10, and 11, in the first frame FRAME1, the second frame FRAME2, and the third frame FRAME3, full scan driving may be performed for the first area DA1, and partial scan driving may be performed for the second area DA2.

In an embodiment, during the vertical blank period in which the vertical synchronization signal Vsync is supplied, the controller 200 may provide the configuration data CONF to the data driver 400. The data driver 400 may select the gamma set corresponding to the color of the image data DATA1 based on the configuration data CONF, and may convert the digital grayscale value corresponding to the position of the corresponding pixel into the analog data signal using the selected gamma set.

In the first period T1, the fourth period T4, and the seventh period T7, the data signals converted from the first image data of the first arrangement type may be supplied to the pixels PX in the first area DA1.

In an embodiment, since (3i-2)th pixel rows L(3i-2) are selected in the second period T2, the data driver 400 may alternately latch the red data R and the blue data B in correspondence with the first data line D1 (that is, output RBRB). In the second period T2, the first gamma set GM1 and the third gamma set GM3 may be alternately applied to the image data corresponding to the first data line D1. In addition, in the second period T2, the data driver 400 may alternately latch the blue data B and the red data R in correspondence with the third data line D3 (that is, output BRBR). In the second period T2, the third gamma set GM3 and the first gamma set GM1 may be alternately applied to the image data corresponding to the third data line D3.

In an embodiment, since (3i-1)th pixel rows L(3i-1) are selected in the fifth period T5, the data driver 400 may alternately latch the blue data B and the red data R in correspondence with the first data line D1 (that is, output BRBR). In the fifth period T5, the third gamma set GM3 and the first gamma set GM1 may be alternately applied to the image data corresponding to the first data line D1. In addition, in the fifth period T5, the data driver 400 may alternately latch the red data R and the blue data B in correspondence with the third data line D3 (that is, output RBRB). In the fifth period T5, the first gamma set GM1 and the third gamma set GM3 may be alternately applied to the image data corresponding to the third data line D3.

In an embodiment, since 3i-th pixel rows L(3i) are selected in the eighth period T8, in the eighth period T8, the data driver 400 may perform substantially the same driving as the driving in the second period T2.

Accordingly, under the same input grayscale condition, a voltage of the data signals output to the first data line D1 in the second period T2 of the first frame FRAME1 may be different from a voltage of the data signals output to the first data line D1 in the fifth period T5 of the second frame FRAME2. Likewise, a voltage of the data signals output to the first data line D1 in the eighth period T8 of the third frame FRAME3 may be different from a voltage of the data signals output to the first data line D1 in the fifth period T5 of the second frame FRAME2.

In this way, the arrangement of the image data and the selected gamma sets GM1, GM2, and GM3 may be appropriately changed according to various second frequencies F2 for the partial scan driving of the second area DA2.

Figure 12:
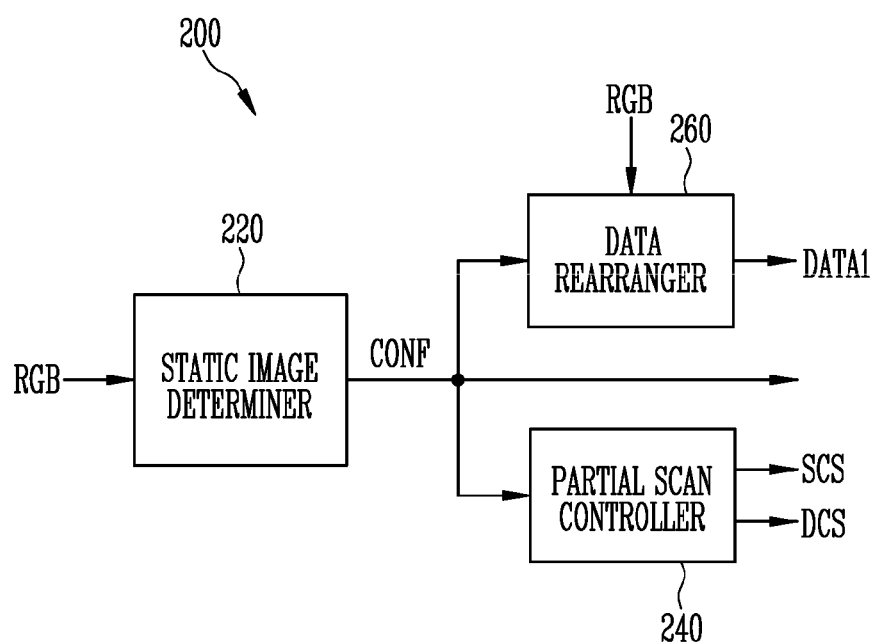
FIG. 12 is a block diagram illustrating an example of a controller included in the display device of FIG. 1.

FIG. 12 is a block diagram illustrating an example of a controller included in the display device of FIG. 1.

Referring to FIGS. 1, 6, 7, and 12, the controller 200 may include a static image determiner 220, a partial scan controller 240, and a data rearranger 260.

The static image determiner 220 may determine whether an input image data RGB represents a static image SI or a moving image by comparing the input image data RGB of successive frames. For example, the static image determiner 220 may determine whether an image is the static image by comparing a previous frame and the current frame. The static image determiner 220 may determine whether the input image data RGB is the static image SI and the second area DA2 including the static image SI based on a difference between the checksum of the input image data RGB of an (n-1)th frame and the checksum of the input image data RGB of an n-th frame, where n may be an integer greater than 1.

Accordingly, the first area DA1 and the second area DA2, and the boundary line BL separating them may be determined. That is, the first area DA1 and the second area DA2 may be changed by a determination of the static image determiner 220.

The static image determiner 220 may generate the configuration data CONF for determining an option for driving the first area DA1 and the second area DA2 at different frequencies when the input image data RGB is determined as the static image SI. The configuration data CONF may include the gamma application information to be applied to positions of the first and second areas DA1 and DA2, respectively. In addition, the configuration data CONF may further include information on the second frequency F2 driving the second area DA2. The information on the second frequency F2 may be determined as one of various preset frequency values. For example, the second frequency F2 may have values such as 30 Hz, 20 Hz, 15 Hz, 10 Hz, and 5 Hz. According to the second frequency F2, the pixel rows selected among the pixel rows in the second area DA2 may vary within one frame, and the arrangement type of the image data and the selected gamma sets may be changed according to the selected pixel rows.

For example, the configuration data CONF may be set to a different value according to the driving frequency (the second frequency F2) of the second area DA2. The data driver 400 may perform an output operation of the data signal (selection and application of the gamma set) as shown in FIG. 8 or 11 based on the information included in the configuration data CONF.

In an embodiment, when the static image SI is not included in the frame, the configuration data CONF may be output as a value including the arrangement type of the data in the first area DA1 and the gamma application information corresponding thereto. Accordingly, the image of the frame may be displayed in the normal driving method for driving the first area DA1.

The partial scan controller 240 may generate the scan control signal SCS and the data control signal DCS for controlling the driving of the scan driver 300 and the data driver 400 corresponding to the partial scan driving in the second area DA2 based on the configuration data CONF. Accordingly, in the partial scan driving in the second area DA2, an error in which the blue gamma is applied to the red data R and an error in which the red gamma is applied to the blue data B can be prevented.

The data rearranger 260 may rearrange the input image data RGB based on the configuration data CONF. The image data DATA1 obtained by rearranging the input image data RGB may be provided to the data driver 400. For example, the data rearranger 260 may generate the first image data of the first arrangement type corresponding to the first area DA1 and the second image data of the second arrangement type corresponding to the second area DA2. In an embodiment, as described with reference to FIGS. 8 and 11, the data rearranger 260 may output the image data in various arrangement types according to the driving frequency of a corresponding area.

As described above, the position and/or size of the second area DA2 may be determined by analyzing the input image data RGB, and the partial scan driving in the second area DA2 may be performed in response to various driving frequencies. Accordingly, versatility of the controller 200A can be improved, and the partial scan driving can be optimized under various conditions.

FIG. 13 is a flowchart illustrating an example of a method of driving a display device according to embodiments of the present inventive concept.

Referring to FIGS. 1 to 13, a driving method of a display device 1000 may change a driving frequency according to whether an image includes a first area DA1 and/or a second area DA2.

It may be determined whether the image of a frame includes the first area DA1 that displays a moving image MI and the second area DA2 that displays a static image SI (S100 and S200). When both the first area DA1 and the second area DA2 are included in the input image data RGB, configuration data CONF having a first value may be generated and provided to a data driver 400 during a vertical blank period (S120). Also, based on a first value of the configuration data CONF, input image data RGB may be converted into first image data corresponding to the first area DA1 and second image data corresponding to the second area DA2 (S140).

Thereafter, an image may be displayed by scanning (normal driving) all of pixel rows in the first area DA1, and by scanning (partial scan driving) a part of pixel rows in the second area DA2 (S160). In this case, since an arrangement type of the first image data and an arrangement type of the second image data are different, different gamma sets for converting image data may be applied differently to suit the arrangement type of each data.

In an embodiment, when only the first area DA1 is included in the image, the image may be determined as the moving image MI, and all of the input image data RGB may be rearranged into the first image data of the first arrangement type (S220). Also, the image may be displayed by the normal driving (S240).

In an embodiment, when only the second area DA2 is included in the image, the image may be determined as the static image SI, and all of the input image data RGB may be rearranged into the second image data of the second arrangement type (S320). Also, the image may be displayed by the partial scan driving (S340).

However, since the driving method of the display device of FIG. 13 has been described in detail with reference to FIGS. 1 to 12, duplicate descriptions will be omitted.

As described above, according to the display device and the driving method thereof according to the embodiments of the present inventive concept, the image data may be arranged in different arrangement types in the first area that displays a moving image and the second area that displays a static image according to the partial scan driving of the second area, and different gamma sets may be applied to the outputs of the data signals corresponding to the odd-numbered data lines in the first area and the second area. Therefore, in the second area in which the partial scan driving is performed, incorrect application (mismatch) of the blue gamma (red gamma) with respect to the red data (blue data) and a difference in gamma and luminance between upper and lower portions of the image may be prevented or minimized. In addition, the data signals can be optimized and output in each of the first area and the second area. Accordingly, both power consumption and image quality can be improved during the multi-frequency driving including the partial scan driving.

Further, the display device may include a general-purpose controller applicable to various driving frequencies while detecting the second area including the static image, so that the partial scan driving can be optimized under various conditions.

However, effects of the present inventive concept are not limited to the above-described effects, and may be variously extended without departing from the spirit and scope of the present inventive concept.

As described above, preferred embodiments of the present inventive concept have been described with reference to the drawings. However, those skilled in the art will appreciate that various modifications and changes can be made to the present inventive concept without departing from the spirit and scope of the inventive concept as set forth in the appended claims.

What is claimed is:

1. A display device comprising:
a display panel displaying an image including at least one of a first area in which a moving image is displayed and a second area in which a static image is displayed;
a controller generating first image data by rearranging image data corresponding to the first area in a first arrangement type and generating second image data by rearranging image data corresponding to the second area in a second arrangement type;
a scan driver sequentially supplying scan signals for writing data to all of pixel rows of the first area during a first period of a first frame and sequentially supplying scan signals for writing data to a part of pixel rows of the second area exclusively during a second period of the first frame; and a data driver supplying data signals corresponding to the first image data to data lines during the first period and supplying data signals corresponding to the second image data to the data lines during the second period.

2. The display device of claim 1, wherein the scan driver stops supplying the scan signals during a third period of the first frame.

3. The display device of claim 2, wherein the scan driver sequentially supplies the scan signals to all of the pixel rows of the first area during a fourth period of a second frame, sequentially supplies the scan signals to other part of the pixel rows of the second area exclusively during a fifth period of the second frame, and stops supplying the scan signals during a sixth period of the second frame.

4. The display device of claim 3, wherein a first frequency at which the first area is driven is greater than a second frequency at which the second area is driven.

5. The display device of claim 4, wherein an arrangement type of the second image data of the first frame is different from an arrangement type of the second image data of the second frame.

6. The display device of claim 5, wherein, under the same input grayscale condition, a voltage of the data signals output to a first data line among the data lines during the first period and a voltage of the data signals output to the first data line during the second period are different.

7. The display device of claim 6, wherein, under the same input grayscale condition, a voltage of the data signals output to the first data line among the data lines during the second period and a voltage of the data signals output to the first data line during the fifth period are different.

8. The display device of claim 4, wherein an arrangement type of the first image data is different from at least one of the arrangement type of the second image data of the first frame and the arrangement type of the second image data of the second frame.

9. The display device of claim 4, wherein the data driver stops outputting the data signals in the third period and the sixth period.

10. The display device of claim 3, wherein the data driver outputs the data signals corresponding to the first image data of the second frame during the fourth period, and outputs the data signals corresponding to the second image data of the second frame during the fifth period.

11. The display device of claim 3, wherein the display panel comprises:

a first pixel row in which a red pixel, a green pixel, a blue pixel, and a green pixel are arranged in a first direction; and a second pixel row in which a blue pixel, a green pixel, a red pixel, and a green pixel are arranged in the first direction, and wherein a pixel arrangement of the first pixel row and a pixel arrangement of the second pixel row are alternately repeated in a second direction.

12. The display device of claim 11, further comprising:

a gamma generator providing a first gamma set corresponding to red, a second gamma set corresponding to green, and a third gamma set corresponding to blue to the data driver.

13. The display device of claim 12, wherein the data driver applies the first to third gamma sets to the first image data in correspondence with the first arrangement type, and applies the first to third gamma sets to the second image data in correspondence with the second arrangement type.

14. The display device of claim 3, wherein the controller comprises:

a static image determiner which determines whether the image data is the static image by comparing input image data of successive frames and generating configuration data for determining an option for driving the first area and the second area at different frequencies based on the determination;

an image data rearranger generating the first image data of the first arrangement type and the second image data of the second arrangement type based on the configuration data; and a partial scan controller generating a scan control signal and a data control signal for controlling driving of the scan driver and the data driver for the second area based on the configuration data.

15. The display device of claim 14, wherein the controller provides the configuration data for determining an operation option of the data driver to the data driver during a vertical blank period of an image frame, and wherein the configuration data includes gamma application information of each of the first and second areas corresponding to positions of the first and second areas and image data arrangement information.

16. The display device of claim 14, wherein the configuration data determines the second frequency driving the second area.

17. The display device of claim 16, wherein under a condition in which the number of pixel rows of the second area is constant, as the second frequency decreases, the number of pixel rows to which the scan signals are supplied during the second period decreases.

* * * * *